May 22, 1956 R. G. NUCKOLLS 2,747,030
STABILIZED SYNCHRONOUS AMPLIFIERS
Filed Oct. 17, 1952
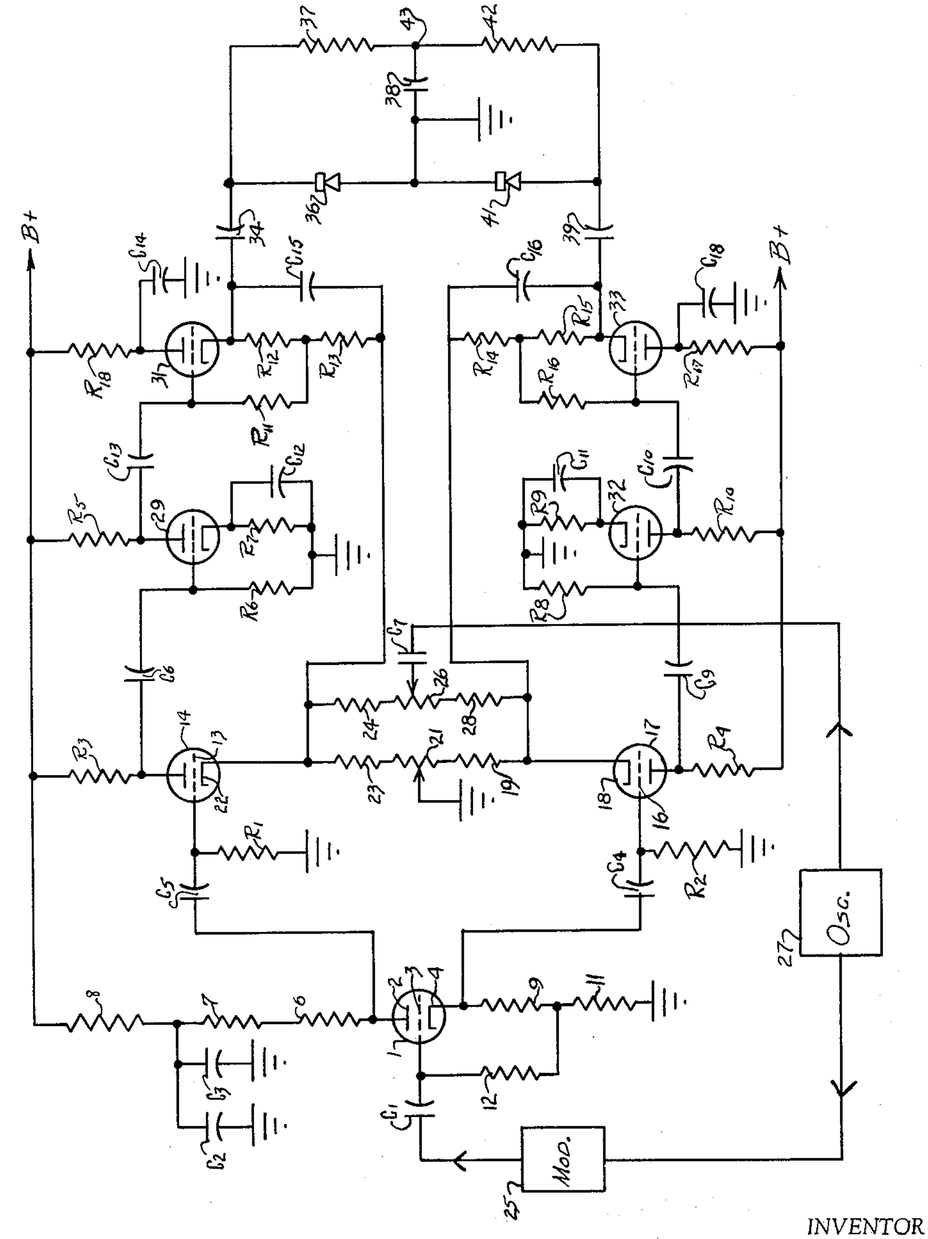
INVENTOR
RICHARD G NUCKOLLS
BY Howard L. Rose
AGENT United States Patent Office 2,747,030
Patented May 22, 1956

2,747,030

STABILIZED SYNCHRONOUS AMPLIFIERS

Richard G. Nuckolls, Chevy Chase, Md., assignor to the United States of America as represented by the Secretary of Commerce Application October 17, 1952, Serial No. 315,439
7 Claims. (Cl. 179—171)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

The present invention relates to a synchronous amplifier and in particular to an amplifier with very narrow band pass characteristics for application in devices where it is necessary to detect a low amplitude signal in the presence of considerable noise. The problem of suppression of noise or random signals on intelligence which is transmitted by wire or wireless systems has constituted a very real problem in the field of communications for some time, and always is present in laboratory experiments involving amplifiers.

To date there are several well-known approaches to the elimination of this problem. The first of these is the use of a narrow band-pass filter which consists of one or more tuned circuits which will eliminate all signals that fall outside of a certain frequency range. One trouble with this system is that when the carrier for the signal is at a very high frequency, the filters which can be developed at present are not selective and stable enough and pass a comparatively wide band, and therefore the noise signal appearing over such a wide band may often approach the same level as the intelligence signal which is to be transmitted. Another approach to this problem of eliminating noise from transmitted signals has been in the use of synchronous amplifiers which may be designed to have very narrow band-pass characteristics, the particular bandwidth of the amplifier being dependent upon the time constant of the output of the circuit and independent of the center frequency. A synchronous amplifier always tracks the carrier frequency, unlike tuned filters.

In prior-art synchronous amplifiers it has been the practice to feed a first signal from a carrier oscillator to one input of the amplifier directly and another signal from this oscillator is fed through a system which modulates the signal with the desired intelligence to be amplified, and this modulated signal is fed to a second input to the amplifier. These two voltages are usually multiplied together by supplying one of the signals to the screen or suppressor grid of a pentode and the other signal to the signal grid of the pentode. Since by feeding one signal to the screen grid of a pentode the gain is varied in accordance with this signal, it is not possible to use feedback in this type of amplifier. Any feedback would cancel the effects of the signal that is applied to the screen grid of the pentode since feed-back eliminates changes in gain in the tube. As a result, in the prior-art devices it is not possible to stabilize the amplifier and also not possible to eliminate changes in gain which are due to variations in tube characteristics and voltage supplies.

It is an object of the present invention to provide a synchronous amplifier in which negative feedback for gain stabilization may be employed.

It is another object of the present invention to provide a synchronous amplifier in which variations in gain in the amplifier proper may be eliminated.

It is another object of the present invention to provide a synchronous amplifier in which the effects of any random noise in the input signal may be reduced to a very small value in the output.

In accordance with the present invention there is provided a synchronous amplifier in which a first signal is obtained directly from an oscillator and a second signal is obtained from the output of a modulating device also fed by the oscillator, which modulating device modulates the signal supplied to it with the intelligence signal to be amplified. The two signals are combined in the amplifier in two ways. One way is so as to add and these are supplied to a first series of amplifier tubes. The signals are also combined through a series of resistors so as to subtract and these also are supplied to another group of amplifier tubes. The output of each group of amplifier tubes is rectified and applied across a condenser in the output which, together with its associated resistors, has a time constant which is chosen to give the desired bandwidth characteristic. The signal which is applied to the amplifier directly from the oscillator will disappear from the output and the signal which is supplied through the modulator will produce a constant direct-current output in the absence of any modulation taking place in the modulator. If there is modulation taking place in the modulator the direct-current output will vary in accordance with the modulation frequency and amplitude. If it is possible to modulate the carrier frequency at a frequency which is very much lower than the carrier frequency, then a long time constant output may be used, and the random noise will disappear from the output since it can be shown mathematically that when random noises are applied to a synchronous amplifier and the time constant of the output is large, the level of the noise signal will be reduced to practically zero. Therefore when the input is modulated, the output will vary only as the modulated signal and will not vary with the noise signal.

Other uses and advantages of the invention will become apparent upon reference to the specification and drawing.

Referring to the figure there is shown a tube 1 having a plate 2, grid 3 and cathode 4. The plate 2 is connected through resistors 6, 7, and 8 to a source of B+ voltage, and the cathode 4 is connected to ground through resistors 9 and 11. The grid 3 is connected to the junction of resistors 9 and 11 through resistor 12. Two outputs are obtained from this tube, the first output being taken from the plate and connected to the grid 13 of tube 14. The second output, which is exactly equal in magnitude and 180 degrees out of phase with the first, is taken from the cathode 4 and is connected to the grid 16 of the tube 17. The cathode 18 of the tube 17 is connected to ground through resistor 19 and a portion of the resistor 21, and the cathode 22 of tube 14 is connected to ground through resistor 23 and the other portion of the resistor 21. The cathode 22 is also connected through resistor 24 and a portion of resistor 26 to a reference voltage input from the local oscillator 27. The cathode 18 is similarly connected to the oscillator through resistor 28 and the other portion of resistor 26. Another output from the oscillator 27 is supplied to the modulator 25, the output of which is connected to the grid 3 of the tube 1. The output of the tube 14 feeds the amplifier tube 29, the output of which feeds a cathode follower amplifier 31. The output of the tube 17 feeds a similar amplifier circuit consisting of the amplifier tube 32 and the cathode follower amplifier 33. A part of the output of the tube 31 is fed back to the cathode of tube 14, constituting a negative feedback circuit, and the output of the tube 33 is fed back to the cathode of the tube 17, also constituting a negative feedback circuit. The output of the tube 31 is connected through the capacitor 34 and the diode 36 to ground. The diode 36 is shunted by the filter network consisting of the resistor 37 and capacitor 38. The output of tube 33 is connected to ground through the capacitor 39 and diode 41. Diode 41 is shunted by the resistor 42 and capacitor 38. When a modulated signal is supplied to the grid of the tube 1, it is amplified and two signals 180 degrees out of phase are fed to the two groups of amplifier tubes. At the same time a signal coming to the resistor 26, which is an unmodulated carrier from the same oscillator which supplies the carrier for the modulated signal, is applied across the cathodes of the tubes 14 and 17. In the tube 17 the two signals will be subtracted from each other, since they will be effectively 180 degrees out of phase, while the two signals supplied to the tube 14 will be added, since they will be in phase. The signal developed in the tube 14 is amplified by the tubes 29 and 31. The signal developed in the tube 17 is amplified by the tubes 32 and 33. The negative feedback supplied to each group of amplifiers respectively will reduce the variation in gains of these amplifiers which is due to aging of the tubes, changes in plate voltage, and changes in values of resistors, capacitors, and other passive elements in the circuits, except for the critical feedback ratios and the output resistors and capacitors, thereby eliminating from the output one element of erroneous signal voltage which is common in many synchronous amplifiers.

The detector circuit comprising capacitor 34, diode 36, resistor 37 and capacitor 38 will now be explained. When the output from the tube 31 swings negative the diode 36 will pass the signal to ground and the capacitor 34 will be charged so that the right-hand plate is positive with respect to the left-hand plate of the capacitor and will be at ground potential. When the signal from the cathode of the tube 31 swings positive, the right side of the capacitor, still being positive with respect to the left side, will become positive with respect to ground, cutting off the diode 36. During this period the right side will follow the variations in the signal supplied to the condenser but will always be positive with respect to ground. Therefore the right side of the condenser will vary as the signal voltage on the cathode of the tube 31 but will never go negative with respect to ground. On the other hand the output of the tube 33, which is supplied to the capacitor 39 will produce an output on the right plate of the capacitor which will always be negative with respect to ground owing to the connection of the diode 41. The resistor 37, capacitor 38, and resistor 42 merely act as a filter circuit to filter the outputs of the two rectifying circuits. Since the reference input to the resistor 26 is applied at the same phase to both sections of the amplifier, whenever the part of the signal due to this input goes positive in the upper output circuit the output of the lower circuit will go correspondingly negative, holding the junction 43 of resistors 42 and 37 at some previously determined potential. However, since the inputs to the tubes 14 and 17 from the tube 1 are 180 degrees out of phase in the presence of the carrier, there will not appear a corresponding compensating change in the upper and lower output circuits as in the case of the reference input but an additive change, and as a result there will be maintained at the point 43 a potential, which by choosing the elements properly will be maintained at all times either negative or positive with respect to ground. If the input to the tube 1 was not modulated, the potential of the terminal point 43 will always remain constant. If there is a signal superposed on the carrier by the modulator 25 and this signal has a frequency which is low compared with the time constant of the output circuit, which is determined by the resistors 37 and 42 and capacitor 38, then the output terminal 43 will vary at the frequency of the modulating source. Even though the reference input applied to the resistor 26 is eliminated in the output, it serves a very important function in this amplifier in that it causes the amplifier to reject any constant frequency carrier which is not of the same frequency as the reference input. In addition, it enables a true signal input to cause a non-zero output. This is caused by the fact that if the reference input frequency is different from that of the modulated carrier which is applied to the grid 3 of the tube 1, there will be produced a beat frequency note in the output. However, this beat frequency note will be filtered out whenever it is at a higher frequency than that provided by the time constant. However, if the reference input and the modulated input are of the same frequency, this beat frequency does not occur but a constant level direct current occurs in the absence of modulation, or in the presence of modulation the direct-current level will vary as the modulating signal. The noise voltage which is introduced in the modulator or in the input wiring from the modulator is effectively eliminated, since the time constant of the output circuit is large. It can be shown by rather complex mathematical analysis that when there is a random noise applied to such a circuit having a large enough time constant in the output, the overall long-time effect of the random noise will be cancelled out in the output of the amplifier. If the noise signal contains a component of the same frequency and phase as the reference voltage over a period of time comparable to the period of the modulation of the desired signal, then the noise will not be eliminated. However, where it is possible to maintain the modulation frequency at a very low value, it can be assumed that very little noise will appear in the output. It is the choosing of the proper value of the condenser 38 which effectively gives the frequency response of the system, in that any spurious signal which tends to cause a variation in the output at a rate greater than that provided by the time constant of the output will be effecively filtered out.

It should be noted that although the circuit has been described as an amplitude-responsive system, such a circuit is equally responsive and provides stabilized performance in the event that the modulator unit causes phase rather than amplitude modulation.

Typical circuit values are given in Table 1.

*Table 1*

| | |
|---|---|
| Resistors: | |
| **6** | 1.5K ohms. |
| **7** | 25K ohms (precision). |
| **8** | 1.0K ohms. |
| **9** | 1.5K ohms. |
| **11** | 25K ohms (precision). |
| **12** | 560K ohms. |
| **19** | 400K ohms (precision). |
| **21** | 50 ohms (wire wound). |
| **23** | 400 ohms (precision). |
| **24** | 10K ohms (precision). |
| **26** | 500 ohms (wire wound). |
| **28** | 10K ohms (precision). |
| **37, 42** | Depends upon resistance of voltmeter, preferably 10,000 ohms. |
| $R_1$ | 1.0 megohm. |
| $R_2$ | 1.0 megohm. |
| $R_3$ | 220K ohms. |
| $R_4$ | 220K ohms. |
| $R_5$ | 220K ohms. |
| $R_6$ | 1.0 megohm. |
| $R_7$ | 3.9K ohms. |
| $R_8$ | 1.0 megohm. |
| $R_9$ | 3.9K ohms. |
| $R_{10}$ | 220K ohms. |
| $R_{11}$ | 1.0 megohm. |
| $R_{12}$ | 2.0K ohms (precision). |
| $R_{13}$ | 2.0K ohms (precision). |
| $R_{14}$ | 2.0K ohms (precision). |

| | |
|---|---|
| $R_{15}$ | 2.0K ohms (precision). |
| $R_{16}$ | 1.0 megohm. |
| $R_{17}$ | 10K ohms. |
| $R_{18}$ | 10K ohms. |
| Capacitors: | |
| $C_1$ | 0.5 microfarad. |
| $C_2$ | 40 microfarads. |
| $C_3$ | 40 microfarads. |
| $C_4$ | 0.5 microfarad. |
| $C_5$ | 0.5 microfarad. |
| $C_6$ | .001 microfarad. |
| $C_7$ | 0.1 microfarad or larger for low frequency. |
| $C_9$ | .001 microfarad. |
| $C_{10}$ | 0.1 microfarad. |
| $C_{11}$ | 25 microfarads. |
| $C_{12}$ | 25 microfarads. |
| $C_{13}$ | 0.1 microfarad. |
| $C_{14}$ | 50 microfarads. |
| $C_{15}$ | 220 micromicrofarads. |
| $C_{16}$ | 220 micromicrofarads. |
| $C_{18}$ | 50 microfarads. |
| 34 | 4.0 microfarads. |
| 38 | Depends upon voltmeter resistance. |
| 39 | 4.0 microfarads. |
| Tubes: | |
| 14, 18, 29, 32 | 1591. |
| 31, 33 | 1592. |
| Crystals | 1N34. |

It will be apparent that the embodiments shown are only exemplary and that various modifications can be made in construction and arrangement within the scope of my invention as defined in the appended claims.

I claim:

1. A synchronous amplifier, comprising a first input phase-splitting circuit connected to a source of modulated voltage, a second input circuit connected to a source of unmodulated voltage, said voltages having the same basic frequency, a first means connected to both of said input circuits for obtaining voltages equal to the sum and difference of said modulated voltage and said unmodulated voltage, separate amplifying means for amplifying the difference voltage and the sum voltage, means for feeding back a portion of the output of each of said amplifying means to the input thereof to stabilize the gains of said amplifying means, a detector means connected to the output of each of said amplifying means, and a filter connected in common to the outputs of each of said detector means.

2. The invention of claim 1 in which said first phase-splitting input circuit provides separate modulated output signals which are 180 degrees out of phase with each other and in which said first means comprises a first and second frequency converter each being connected to respective outputs of said first phase-splitting circuit and said second input circuit, said frequency converters providing a first voltage equal to the sum of said modulated and unmodulated signals and a second voltage equal to the difference between said modulated and unmodulated signals, respectively.

3. The invention according to claim 2 in which said amplifying means comprise a first amplifier connected to the output of said first frequency converter and a second amplifier connected to the output of said second frequency converter, the output of said first amplifier being connected to one of said detector means and to an input of said first frequency converter to provide negative feedback thereto, said second amplifier being similarly connected to its associated detector means and said second frequency converter.

4. The invention according to claim 3 in which said first frequency converter comprises a first electron tube having at least a grid and a cathode, said grid being connected to receive one of said modulated output signals, a first resistor, said cathode being grounded through a portion of said first resistor, and in which said second frequency converter comprises a second electron tube having at least a grid and a cathode, the grid of said second electron tube being connected to receive said modulated output signal of opposite phase and said cathode being grounded through the other portion of said first resistor, the cathodes of said first and second tubes being connected to receive said unmodulated signal.

5. The invention according to claim 4 in which a portion of the output of said first amplifier is connected to the cathode of said first electron tube and a portion of the output of said second amplifier is connected to the cathode of said second electron tube.

6. The invention according to claim 5, in which the time constant of said filter is large as compared with the period of the unmodulated voltage.

7. A synchronous amplifier comprising a first input phase-splitting circuit connected to a source of modulated voltage, a second input circuit connected to a source of unmodulated voltage, said voltages being of the same basic frequency, first means connected to said first and said second input circuits for producing voltages equal to the sum and difference of the said two voltages, separate amplifying means for amplifying each of said sum and difference voltages, means for feeding back a portion of the output of each of said amplifying means for stabilizing the gains thereof, a separate detector means connected to the output of each of said amplifying means, and a filter having a time constant which is large as compared with the period of the unmodulated voltage, the outputs of said detectors being connected to a common input to said filter.

References Cited in the file of this patent

UNITED STATES PATENTS

| | | |
|---|---|---|
| 2,211,010 | Hollmark | Aug. 13, 1940 |
| 2,365,218 | Rogers | Dec. 19, 1944 |
| 2,438,425 | Vance | Mar. 23, 1948 |
| 2,464,353 | Smith et al. | Mar. 15, 1949 |
| 2,570,249 | Kenyon | Oct. 9, 1951 |
| 2,575,047 | Crosby | Nov. 13, 1951 |